(12) United States Patent
Malparty et al.

(10) Patent No.: US 11,756,008 B2
(45) Date of Patent: Sep. 12, 2023

(54) SYSTEM AND METHOD FOR REAL-TIME THREE-PARTY TRANSACTION PROCESSING

(71) Applicant: AMADEUS S.A.S., Biot (FR)

(72) Inventors: Maxence Achille Henri Malparty, Antibes (FR); Nicolas Dominique Marcel Guillon, Mougins (FR); Jose Vicente Da Cruz, Antibes (FR); Jean-Pierre Boutherin, Le Cannet (FR); Olivier Alexandre Roth, Grasse (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 17/420,935

(22) PCT Filed: Feb. 3, 2020

(86) PCT No.: PCT/EP2020/052562
§ 371 (c)(1),
(2) Date: Jul. 6, 2021

(87) PCT Pub. No.: WO2020/164939
PCT Pub. Date: Aug. 20, 2020

(65) Prior Publication Data
US 2022/0092560 A1 Mar. 24, 2022

(30) Foreign Application Priority Data
Feb. 11, 2019 (FR) ...................................... 1901335

(51) Int. Cl.
*G06Q 20/00* (2012.01)
*G06Q 20/02* (2012.01)
*G06Q 20/14* (2012.01)

(52) U.S. Cl.
CPC ............. *G06Q 20/02* (2013.01); *G06Q 20/14* (2013.01)

(58) Field of Classification Search
USPC ........................................................ 705/39
See application file for complete search history.

(56) References Cited

U.S. PATENT DOCUMENTS

| 9,875,469 | B1* | 1/2018 | Chin .................. G06Q 20/3276 |
| 2004/0254866 | A1* | 12/2004 | Crumbach ........... G06Q 20/102 |
| | | | 705/34 |
| 2013/0046599 | A1* | 2/2013 | Coppinger ......... G06Q 30/0236 |
| | | | 705/14.23 |

OTHER PUBLICATIONS

Authors: D.K. Gifford et al; Title: Payment switches for open networks; Publisher: IEEE; Date of Conference: Mar. 5-9, 1995; (Year: 1995) (Year: 1995).*

(Continued)

*Primary Examiner* — Bruce I Ebersman
*Assistant Examiner* — Hatem M Ali
(74) *Attorney, Agent, or Firm* — Perry + Currier

(57) ABSTRACT

A method of intermediating transactions includes, at an intermediation server: receiving invoice data defining a price payable to a vendor for supplying a product to a customer; extracting, from the invoice data, a vendor identifier corresponding to the vendor; determining, in association with the invoice data, a customer identifier corresponding to the customer; retrieving a payer identifier corresponding to a payer associated with the customer; retrieving, based on at least the payer identifier, a transaction policy; according to the retrieved transaction policy, allocating an eligible portion of the price to the payer identifier, and allocating a remaining portion of the price to the customer identifier; and generating and transmitting payment data for initiating a payment of the eligible portion from the payer to the vendor.

8 Claims, 8 Drawing Sheets

(56) References Cited

OTHER PUBLICATIONS

Authors: Ashfakul Islam et al.; Title: Performance Analysis of a Tree-Based Consistency Approach for Cloud Databases; Publisher: IEEE; Date of Conference: Jan. 30, 2012-Feb. 2, 2012; (Year: 2012) (Year: 2012).*

PCT International Search Report, Feb. 25, 2020 re PCT International Patent Application No. PCT/EP2020/052562.

PCT Written Opinion of the International Searching Authority, dated Feb. 25, 2020, PCT International Patent Application No. PCT/EP2020/052562.

* cited by examiner

SYSTEM AND METHOD FOR REAL-TIME THREE-PARTY TRANSACTION PROCESSING

FIELD

The specification relates generally to electronic transaction processing, and specifically to a system and method for real-time transaction intermediation.

BACKGROUND

Various activities undertaken by members of organizations (e.g. employees of a corporate entity) may require the members to incur expenses. Examples of such activities include travel, obtaining supplies, and the like. Reimbursement of such expenses typically occurs after the expenses have been not only incurred, but also paid for by the members. In other words, reimbursement is typically a retrospective process that may be poorly suited to applying expense policies, detecting potential fraud, and the like. Further, reimbursement processes are typically conducted manually, and may therefore be time-consuming and error-prone.

SUMMARY

An aspect of the specification provides a method of intermediating transactions, comprising, at an intermediation server: receiving invoice data defining a price payable to a vendor for supplying a product to a customer; extracting, from the invoice data, a vendor identifier corresponding to the vendor; determining, in association with the invoice data, a customer identifier corresponding to the customer; retrieving a payer identifier corresponding to a payer associated with the customer; retrieving, based on at least the payer identifier, a transaction policy; according to the retrieved transaction policy, allocating an eligible portion of the price to the payer identifier, and allocating a remaining portion of the price to the customer identifier; and generating and transmitting payment data for initiating a payment of the eligible portion from the payer to the vendor.

In an embodiment, receiving the invoice data comprises receiving the invoice data from a vendor computing device corresponding to the vendor identifier. In another embodiment, determining the customer identifier comprises extracting the customer identifier from the invoice data. In yet another embodiment, determining the customer identifier comprises: obtaining a unique invoice identifier; and receiving an association request from a customer computing device corresponding to the customer identifier, the association request containing the unique invoice identifier. In another embodiment, obtaining the unique invoice identifier comprises generating the unique identifier and transmitting the unique identifier to the vendor computing device for capture by the customer computing device.

In an embodiment, receiving the invoice data comprises receiving invoice data from a customer computing device corresponding to the customer identifier. In another embodiment, extracting the vendor identifier comprises performing optical character recognition on the invoice data. In yet another embodiment, the provided method further comprises: when the remaining portion is non-zero, transmitting a notification to a customer computing device corresponding to the customer identifier, the notification containing an indication of the remaining portion.

In an embodiment, generating and transmitting the payment data comprises: requesting the payment data from an external payment system; and transmitting the payment data to a customer computing device corresponding to the customer identifier for presentation to a vendor computing device corresponding to the vendor identifier to effect the payment. In another embodiment, generating and transmitting the payment data comprises: sending a payment instruction to an external payment system to effect the payment; and sending payment notifications to each of (i) a customer computing device corresponding to the customer identifier and (ii) a vendor computing device corresponding to the vendor identifier.

A second aspect of the specification provides an intermediation server that fulfills the steps of the provided method.

A third aspect provides a system for real-time three-party transaction processing, comprising: (i) a vendor computing device associated with a vendor, and configured to generate invoice data defining a price payable to the vendor for supplying a product to a customer; (ii) an intermediation server configured to: receive the invoice data via a network; extract, from the invoice data, a vendor identifier corresponding to the vendor; determine, in association with the invoice data, a customer identifier corresponding to the customer; retrieve a payer identifier corresponding to a payer associated with the customer; retrieve, based on at least the payer identifier, a transaction policy; according to the retrieved transaction policy, allocate an eligible portion of the price to the payer identifier, and allocate a remaining portion of the price to the customer identifier; generate and transmit payment data, via the network, for initiating a payment of the eligible portion from the payer to the vendor; and (iii) a customer computing device associated with the customer, the customer computing device configured to: receive the payment data from the intermediation server via the network; and present the payment data for receipt by the vendor computing device to execute the payment of the eligible portion.

In an embodiment, the intermediation server is further configured, to generate the payment data, to request a virtual card number (VCN) from a payment subsystem connected with the intermediation server via the network; and wherein the customer computing device is configured to receive and present the VCN to the vendor computing device In another embodiment, the vendor computing device is configured to execute the payment of the eligible portion by transmitting the VCN to the payment subsystem. In yet another embodiment, the vendor computing device is configured to transmit the invoice data to the intermediation server via the network.

In an embodiment, the intermediation server is configured, responsive to receiving the invoice data from the vendor computing device, to obtain a unique invoice identifier and transmit the unique invoice identifier to the vendor computing device for presentation to the customer computing device; wherein the customer computing is configured to capture the unique invoice identifier and transmit an association request containing the customer identifier and the unique invoice identifier to the intermediation server via the network; and wherein the intermediation server is configured to determine the customer identifier by retrieving the customer identifier from the association request. In another embodiment, the customer computing device is configured to capture the invoice data and transmit the invoice data to the intermediation server via the network.

BRIEF DESCRIPTIONS OF THE DRAWINGS

Embodiments are described with reference to the following figures, in which.

DETAILED DESCRIPTION

Figure 1:
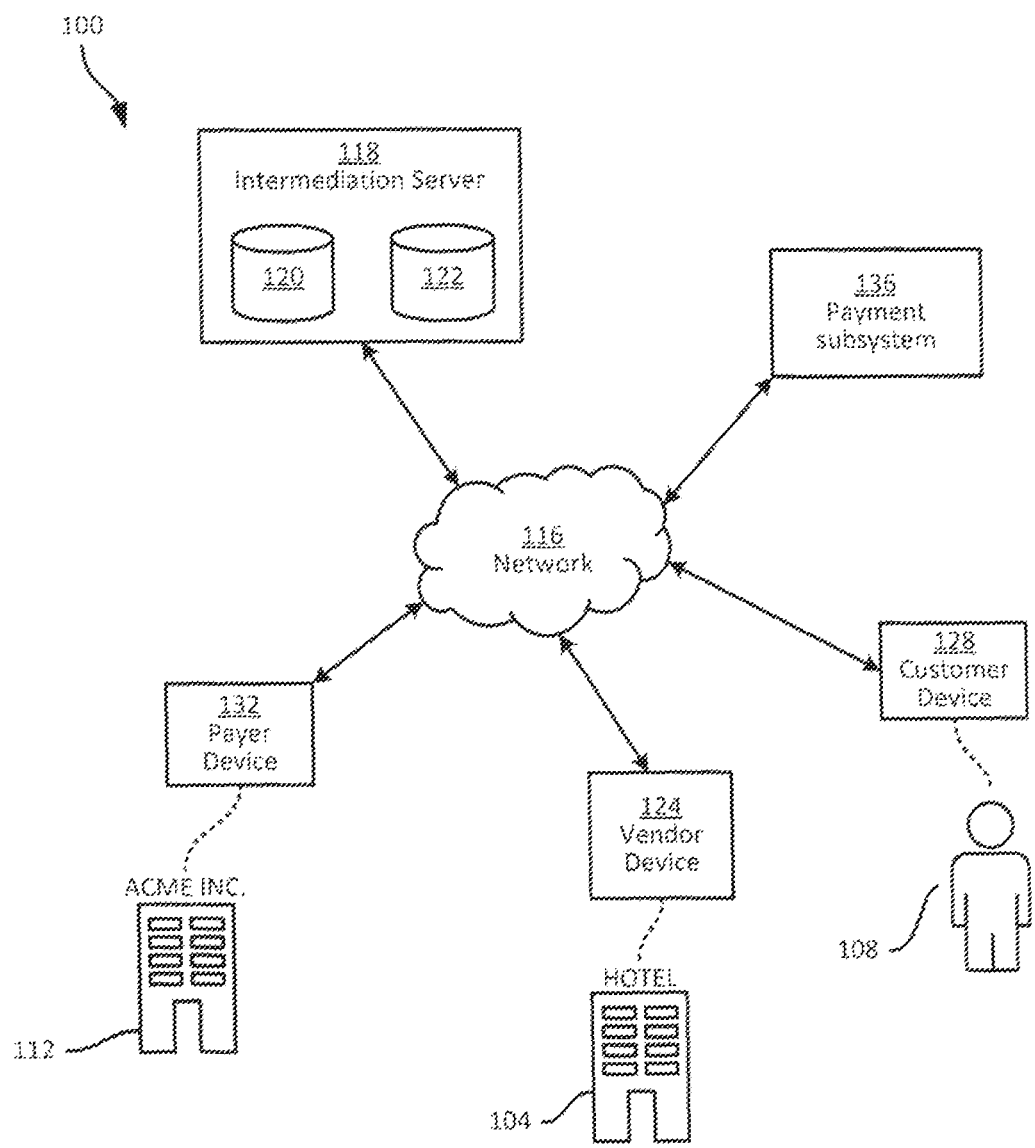
FIG. 1 depicts a system for real-time transaction intermediation.

FIG. 1 depicts a system 100 for real-time transaction intermediation. The transactions discussed herein typically include the provision of products (i.e. goods and/or services) from a vendor 104 to a customer 108. The vendor 104, in the present example, is a hotel operator and the products provided to the customer 108 may therefore be lodging in hotel rooms. As will be apparent to those skilled in the art, however, a wide variety of vendors may provide a wide variety of products to the customer 108. As will also be apparent, although a single vendor 104 and a single customer 108 are illustrated in FIG. 1, the functionality of the system 100 discussed herein may be applied to any suitable number of vendors 104 and customers 108.

The products provided to the customer 108 by the vendor 104, such as the above-mentioned hotel stays, have associated prices payable to the vendor 104 in exchange for the products. Payment of such prices to the vendor 104 is not necessarily made by the customer 108, however, although the customer 108 is the recipient of the products. Specifically, in the example illustrated in FIG. 1, the customer 108 is associated with a payer entity 112. The payer entity 112 (also referred to simply as the payer 112 herein) may be an organization or an individual, and the association between the payer 112 and the customer 108 is not particularly limited. In the discussion below, for the purpose of illustration, the payer 112 is assumed to be a corporation employing the customer 108. A wide variety of other associations between payers 112 and customers 108 are also contemplated. In general, as a result of the association (whatever the specific nature of the association may be) between the payer 112 and the customer 108, it may be necessary for at least some payments for products supplied by the vendor 104 to the customer 108 to be made by the payer 112 rather than the customer 108.

To that end, the system 100 includes various components enabling payment to be effected from the payer 112 (i.e. from an account, e.g. at a financial institution, controlled by the payer 112) to the vendor 104 responsive to the provision of products by the vendor 104 to the customer 108. Of particular note, the system 100 enables such payments to be made via intermediation of a primary transaction (i.e. the transaction during which the vendor 104 receives payment) between the vendor 104 and the customer 108. In other words, the mechanisms discussed herein are not directed to retrospectively reimbursing the customer 108 for payments made by the customer 108 to the vendor 104, via secondary transactions (i.e. transactions in which the customer 108 receives payment) occurring after the primary transaction. For the above reason, the intermediation functionality discussed herein is referred to as real-time intermediation, i.e. intermediate during the primary transaction.

To implement real-time intermediation of transactions, the system 100 includes a plurality of computing devices interconnected by a network 116. The network 116 includes any suitable combination of local and wide-area networks (e.g. including the Internet), implemented as any suitable combination of wired and/or wireless networks. In particular, the system 100 includes an intermediation server 118 (also referred to herein simply as the server 118) configured, as will be discussed in detail below, to receive invoice data defining a primary transaction. The intermediation server 118 is further configured to allocate portions of a payment (i.e. a price for the product(s) involved in the transaction) defined by the invoice data between the customer 108 and the payer 112. The intermediation server 118 is further configured to generate and transmit payment data to other devices of the system 100 to effect payment of any portion allocated to the payer 112, from the payer 112 to the vendor 104.

The intermediation server 118, to implement the above-mentioned functionality, stores an invoice repository 120 containing received invoice data as well as associated data generated and employed during transaction intermediation. The intermediation server 118 also stores a policy repository 122 containing rules and other settings employed both in carrying out the allocation of payment portions between the payer 112 and the customer 108, and in effecting payments from the payer 112 to the vendor 104.

The system 100 also includes a vendor computing device 124 operated by the vendor 104. The vendor device 124 can be implemented as any one of, or any combination of, a server, desktop computer, mobile computing device, or the like. In general, the vendor device 124 generates invoice data specifying a price payable to the vendor 104 for one or more products supplied by the vendor 104 to the customer 108. The vendor device 124 may also transmit the invoice data to other computing devices in the system 100, in some embodiments, and may also receive notifications, payment data and the like from such other devices.

In addition, the system includes a customer computing device 128 operated by the customer 108. The customer device 128 can be a desktop computer, a mobile computing device such as a smart phone, laptop computer, tablet computer or the like. The customer device 128 is configured to exchange data with one or more of the intermediation server 118 and the vendor device 124. For example, in some embodiments the customer device 128 is configured to obtain invoice data and provide the invoice data to the intermediation server 118 to initiate intermediation of a transaction. The customer device 128 can also be configured to receive notifications and/or payment data from the intermediation server 118.

Further, the system 100 includes a payer computing device 132 operated by the payer 112. The payer device 132 can be implemented as any one of, or any combination of, a server, desktop computer, mobile computing device, or the like. The payer device 132 can be configured to receive notifications from the intermediation server 118, and may also be configured to provide data to the intermediation server 118 for storage in the profile repository 122 (e.g. during deployment of the system 100). For example, the payer device 132 can maintain and periodically update transaction policy data defining how payments are allocated between the payer 112 and the customer 108. The payer device 132 can provide such policy data to the intermediation server 118, or can respond to requests for policy decisions from the intermediation server 118. The payer device 132 may also maintain an expense repository or the like, containing records defining payments made by the payer 112 for products provided to the customer 108, and the like. Such records may be updated responsive to notifications received at the payer device 132 from the intermediation server 118.

The system 100 also includes a payment subsystem 136, including one or more computing devices (e.g. servers and the like) operated by one or more financial institutions, payment networks and the like. In general, the payment subsystem 136 maintains financial accounts associated with each of the payer 112 and the vendor 104 (and optionally, the customer 108). The payment subsystem 136 is configured to receive payment instructions and effect payments (i.e. transfers of funds between the above-mentioned accounts). The payment subsystem 136 can also be configured to generate payment data, such as virtual credit card numbers and the like, for use by other components of the system 100 prior to effecting payment.

Figure 2:
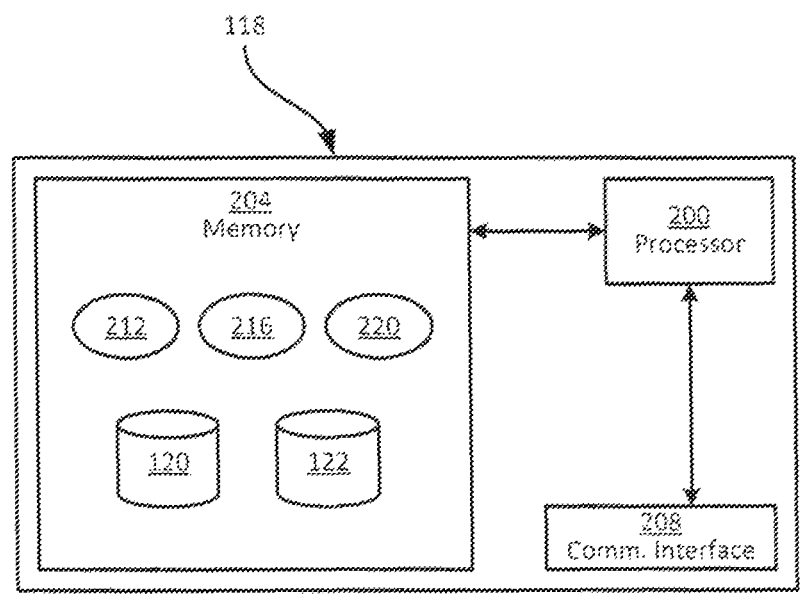
FIG. 2 depicts certain internal components of the intermediation server of FIG. 1.

Turning now to FIG. 2, before discussing the functionality of the system 100 in greater detail, certain components of the intermediation server 118 will be discussed in greater detail.

The intermediation server 118 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The server 118 also includes a communications interface 208 interconnected with the processor 200. The communications interface 208 enables the server 118 to communicate with the other computing devices of the system 100 via the network 116. The communications interface 208 therefore includes any necessary components (e.g. network interface controllers (NICs), radio units, and the like) to communicate via the network 116. The specific components of the communications interface 208 are selected based on upon the nature of the network 116. The server 118 can also include input and output devices (not shown) connected to the processor 200, such as keyboards, mice, displays, and the like.

The components of the server 118 mentioned above can be deployed in a single enclosure, or in a distributed format. In some examples, therefore, the intermediate server 118 includes a plurality of processors, either sharing the memory 204 and communications interface 208, or (e.g. when geographically distributed but logically associated with each other) each having distinct corresponding memories and communications interfaces.

The memory 204 stores the repositories 120 and 122 mentioned above in connection with FIG. 1. The memory 204 also stores a plurality of computer-readable programming instructions, executable by the processor 200, in the form of various applications. The applications stored in the memory 204 include an orchestrator application 212, a notification application 216, and a parser application 220. As will be understood by those skilled in the art, the processor 200 executes the instructions of the applications 212, 216 and 220 (as well as any other suitable applications stored in the memory 204) in order to perform various actions defined by the instructions contained therein. In the description below, the processor 200, and more generally the server 118, are said to be configured to perform those actions. It will be understood that they are so configured via the execution (by the processor 200) of the instructions of the applications stored in memory 204.

Execution of the orchestrator application 212, as will be discussed below, configures the intermediate server 118 to receive invoice data for storage in the repository 120, and to intermediate a transaction to effect payment corresponding to the invoice data, based on the contents of the repository 122 (and optionally, data retrieved from computing devices external to the server 118). The specific technical functions performed by the server 118 to implement the above functionality will be discussed in greater detail below.

The orchestrator application 212 can also implement one or more application programming interfaces (APIs) exposed to other computing devices via the network 116, for sending and receiving various data relating to the transactions intermediated by the server 118. The vendor device 124, the customer device 128 and the payer device 132, as will now be apparent to those skilled in the art, may be configured to transmit data to the server 118 in accordance with the above-mentioned APIs.

Execution of the notification application 216 configures the server 118 to generate and transmit notifications (e.g. email messages, text messages, application messages formatted according to one or more APIs, or the like) to one or more of the vendor device 124, the customer device 128 and the payer device 132. The notifications transmitted via execution of the application 216 are generated in response to certain actions performed via execution of the application 212. In other examples, the functionality implemented by the application 216 can be implemented by a separate computing device in the system 100, to which the server 118 transmits notification requests for processing.

The parser application 220, when executed by the processor 200, configures the server 118 to parse invoice data obtained by the server 118. In particular, the server 118 can be configured to parse unstructured invoice data (e.g. images of printed receipts) to extract relevant information therefrom for further processing. The parser application 220 can also be executed to parse invoice data that, while not in image format, does not comply with a predetermined schema as will be discussed below. For example, the invoice data may be received as a PDF file containing computer-readable text rather than images. The text may nevertheless not be presented in a predefined schema and may therefore still require parsing. Such invoice data is also referred to herein as unstructured. In some embodiments, the functionality implemented by the application 220 can be implemented by a separate computing device in the system 100, to which the server 118 transmits parsing requests, and from which the server 118 receives extracted invoice data.

Figure 3:
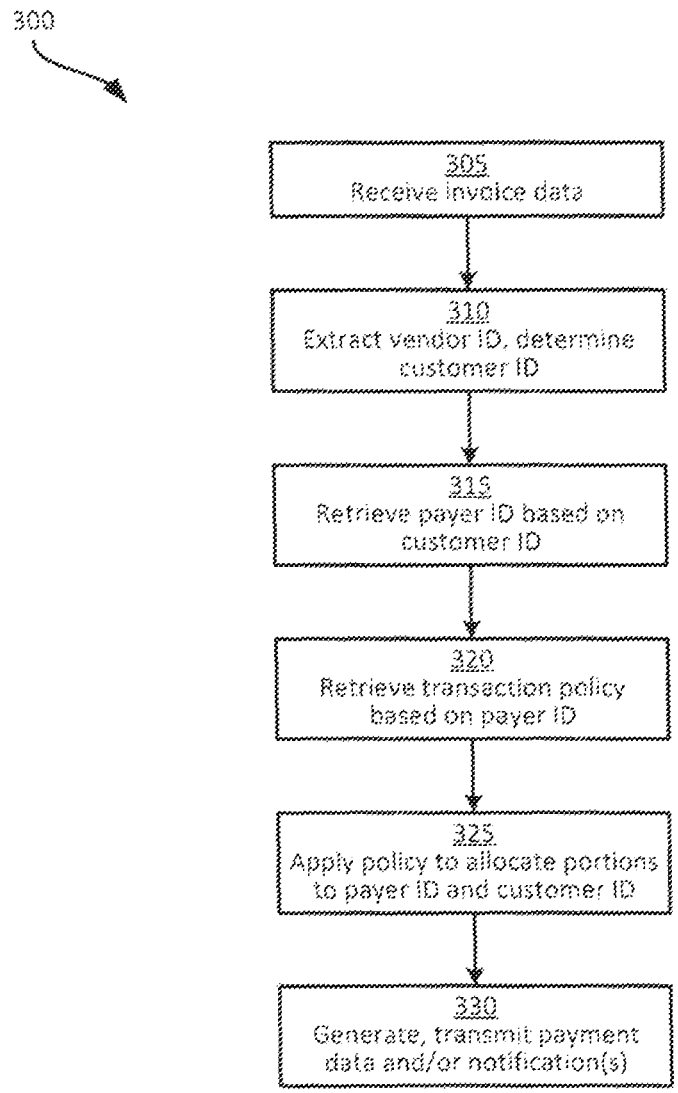
FIG. 3 depicts a method for real-time transaction intermediation.

Turning now to FIG. 3, certain aspects of the operation of the system 100 will be described in greater detail. Specifically, FIG. 3 illustrates a method 300 of real-time transaction intermediation. The method 300 will be described in conjunction with its performance within the system 100. In particular, the blocks of the method 300 are performed by intermediation server 118 via execution of the orchestrator application 212, the notification application 216 and the parser application 220 by the processor 200.

At block 305, the server 118 is configured to receive invoice data defining a primary transaction. That is, the invoice data received at block 305 defines a price payable to the vendor 104 for supplying one or more products to the customer 108 (although, as will be evident in the discussion below, the invoice data does not necessarily identify the customer 108). Several mechanisms are contemplated for receiving invoice data at block 305, examples of which are illustrated in FIGS. 4A and 4B.

Figure 4A:
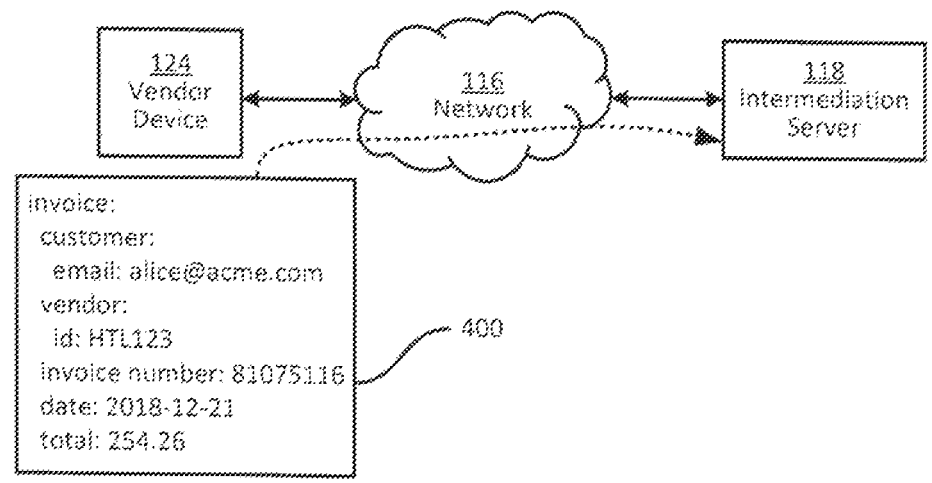
FIG. 4A depicts an example of the receipt of invoice data at the intermediation server at block 305 of the method 300.

Referring first to FIG. 4A, the invoice data can be received at block 305 from the vendor device 124 via the network 116. For example, responsive to generation of the invoice data (e.g. when the customer 108 checks out of the hotel 104), the vendor device 124 can be configured to transmit the invoice data to the server 118. FIG. 4A illustrates example invoice data 400 in the form of structured data. That is, the invoice data 400 contains various attributes in computer-readable fields (e.g. name/value pairs), according to any suitable predefined schema. An example of the format employed for the invoice data is the "Invoice" schema defined by schema.org (e.g. see http://schema.org/Invoice), although a wide variety of other schemas may also be employed. Structured invoice data may be received in any of a variety of file formats, including eXtensible Markup Language (XML), JavaScript Object Notation (JSON), and the like.

Transmission of invoice data from the vendor device 124 to the server 118 typically requires integration between the vendor device 124 and the server 118. For example, the vendor 104 may be required to configure the vendor device 124 to interoperate with the server 118 (e.g. via the APIs mentioned above), and to generate invoice data in the predefined format. Certain vendors may lack such integration, and the invoice data may therefore also be received at the server 118 from the customer device 128 rather than the vendor device 124.

Figure 4B:
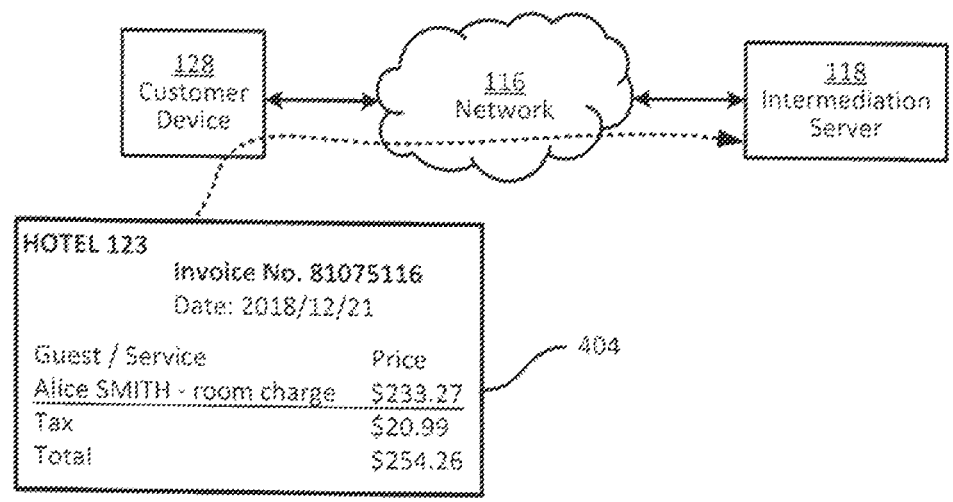
FIG. 4B depicts another example of the receipt of invoice data at the intermediation server at block 305 of the method 300.

FIG. 4B illustrates the receipt of invoice data 404 from the customer device 128. For example, the invoice data 404 may be an image (in any suitable file format, e.g. PDF, JPEG, or the like) of a printed invoice generated by the vendor device 124 or a peripheral connected thereto, and captured by a camera of the customer device 128. The invoice data 404 is therefore referred to as unstructured, as specific attributes of the invoice data, although represented visually by the image, are not explicitly delimited according to a computer-readable format.

In other words, the invoice data can be received at block 305 from either of the vendor device 124 and the customer device 128. Further, the invoice data can be received as structured data (e.g. as shown in FIG. 4A), or as unstructured data (e.g. as shown in FIG. 4B). Although the receipt of structured invoice data is shown in FIG. 4A as being associated with the vendor device 124, in other examples structured invoice data can also be received from the customer device 128. For example, the customer device 128 can be configured to generate a graphical interface for receiving input (e.g. from the customer 108) consisting of the structured invoice data. Additionally, in some embodiments unstructured invoice data (e.g. an image as shown in FIG. 4B) can be received from the vendor device 124. In further embodiments, the invoice data received at block 305 may include both an image as in FIG. 4B and structured data as in FIG. 4A.

Upon receipt of the invoice data, the server 118 is configured to store the invoice data in the repository 120.

The server 118 may also generate a unique identifier corresponding to the invoice data, and store the identifier in the repository in association with the invoice data.

Figure 5:
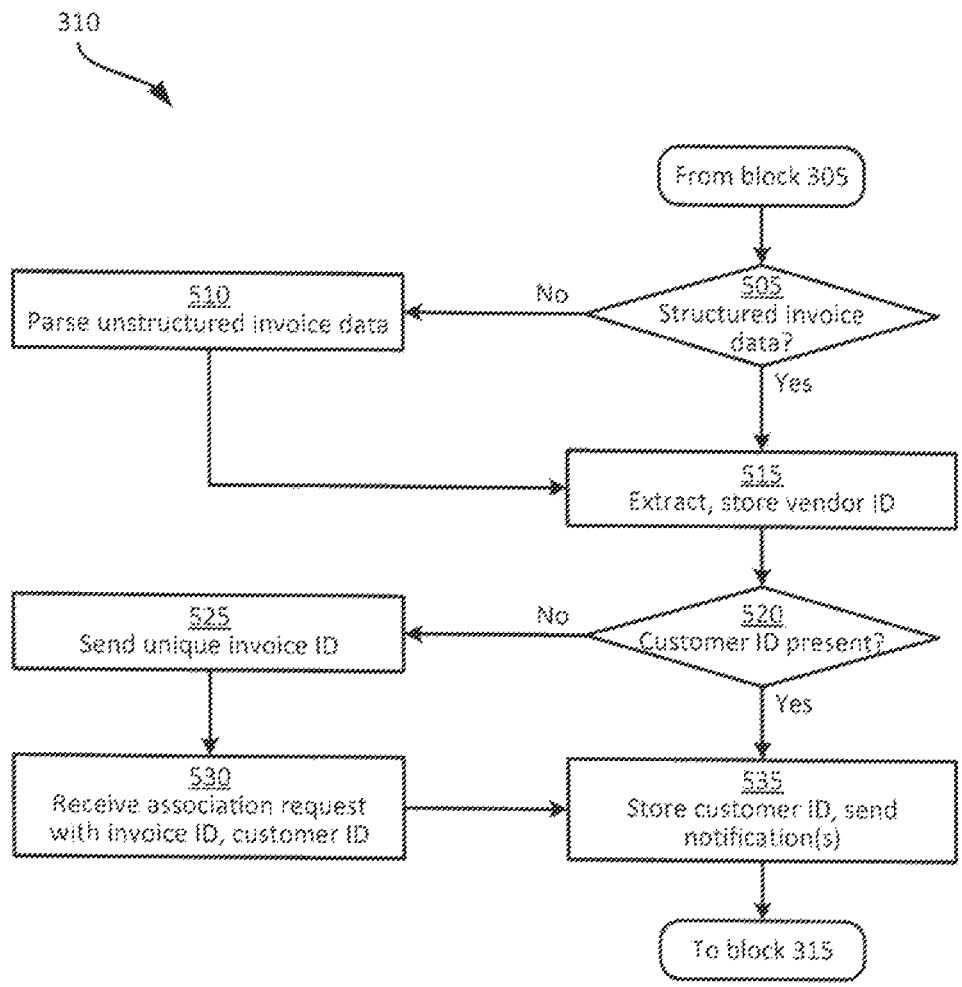
FIG. 5 depicts a method of performing block 310 of the method of FIG. 3.

For the server 118 to intermediate a transaction, the identities of each of the vendor 104, the customer 108, and the payer 112 must be known to the server 118. At block 310, the server 118 is therefore configured to extract a vendor identifier (i.e. of the vendor 104) from the invoice data, and to determine a customer identifier (i.e. of the customer 108) that corresponds to the invoice data. The actions performed by the server 118 to obtain the vendor and customer identifiers vary depending on the contents of the invoice data received at block 305. FIG. 5 illustrates an example method of performing block 310.

Beginning at block 505, the server 118 is configured to determine whether the invoice data received at block 305 is structured or unstructured data. When the invoice data in unstructured, such as the invoice data 404 shown in FIG. 4B (e.g. an image captured by camera of the customer device 128), the server 118 proceeds to block 510. At block 510, the server 118 is configured to parse the unstructured invoice data, for example via execution of the parser application 220. Via execution of the parser application 220 the server 118 is configured to identify text in the invoice data 404 (e.g. via any suitable optical character recognition, OCR, operation), and to classify the text identified in the invoice data 404. Classification of text identified in the invoice data 404 serves to identify portions of the text corresponding to various attributes of the primary transaction, including any one or more of a vendor identifier, a customer identifier, a price, date and/or time information, a description of the products provided by the vendor 104, and the like. Classification of text identified in the invoice data can be achieved through the application of any suitable one of, or any suitable combination of, classification mechanisms, including machine learning-based classifiers.

In other words, at block 510 the server 118 is configured to generate structured invoice data from the unstructured invoice data. The output of the parsing operation(s) is stored in the repository 120 in association with the initially received unstructured invoice data, e.g. in a common data object. In some embodiments, rather than perform block 510 locally, the server 118 is configured to transmit a parsing request containing the unstructured invoice data to a further computing device of the system 100, which is in turn configured to parse the unstructured invoice data and return the resulting structured invoice data to the server 118.

At block 515, having obtained structured invoice data (either via block 510, or because the invoice data received at block 305 was structured invoice data), the server 118 is configured to extract a vendor identifier from the structured invoice data. The vendor identifier can be a name of the vendor, such as the string "HOTEL 123" in the invoice data 404 shown in FIG. 4B. The vendor identifier may also be a predefined identifier also stored in the profile repository 122, such as the string "HTL123" in the invoice data 400 shown in FIG. 4A. In other examples, the vendor identifier need not be extracted directly from the invoice data itself, but can instead be extracted from metadata accompanying the invoice data. For example, when the invoice data is received at block 305 in the form of structured invoice data via a predefined API call, the vendor device 124 has typically provided authentication data (e.g. an account identifier and password, or the like) to the server 118 prior to transmitting the invoice data. The authentication process associates the vendor device 124 with a vendor identifier from the profile repository 122, and the vendor identifier therefore need not be present in the invoice data itself.

At block 520, the server 118 is configured to determine whether the invoice data (or metadata associated therewith, obtained from a transmission containing the invoice data as described above) contains a customer identifier. In particular, the profile repository 122 includes records corresponding to each customer 108 enrolled for use of the system 100, and the server 118 is configured to determine at block 520 whether a customer identifier corresponding to one of the above-mentioned records is present in the invoice data or associated metadata. Dependent on the presence or absence of a customer identifier, the server 118 is configured to select a different customer identification mechanism to obtain the customer identifier.

When the invoice data is received at block 305 from the customer device 128, the determination at block 520 is typically affirmative. As discussed in connection with the vendor identifier at block 515, the customer device 128 can be configured to transmit invoice data to the server 118 via an authenticated connection established via the network 116, and therefore even when the invoice data lacks a customer identifier, the transmission (e.g. an API call transmitted by the customer device 128) is associated with a customer identifier). In other examples, the invoice data itself includes a customer identifier, such as the string "Alice Smith" in the invoice data 404 or the email address "alice@acme.com" in the invoice data 400.

When the determination at block 520 is negative, indicating that the invoice data (and any metadata associated with the transmission of the invoice data to the server 118) does not contain a customer identifier matching a record in the profile repository 122, the server 118 is configured to proceed to block 525. At block 525, the server 118 is configured to initiate an association process to retrieve a customer identifier. Typically, when the determination at block 520 is negative, the invoice data was received at block 305 from the vendor device 124 rather than from the customer device 128. Therefore at block 525, the server 118 is configured to transmit the above-mentioned unique invoice identifier to the vendor device 124 from which the invoice data was received at block 305. The unique invoice identifier is presented by the vendor device 124, e.g. on a display, via a short-range communication interface, or the like, for capture by the customer device 128. The customer device 128 is then configured to transmit an association request to the server 118, containing the unique identifier (as well as the customer identifier, by virtue of the above-noted authentication between the customer device 128 and the server 118)

Figure 6:
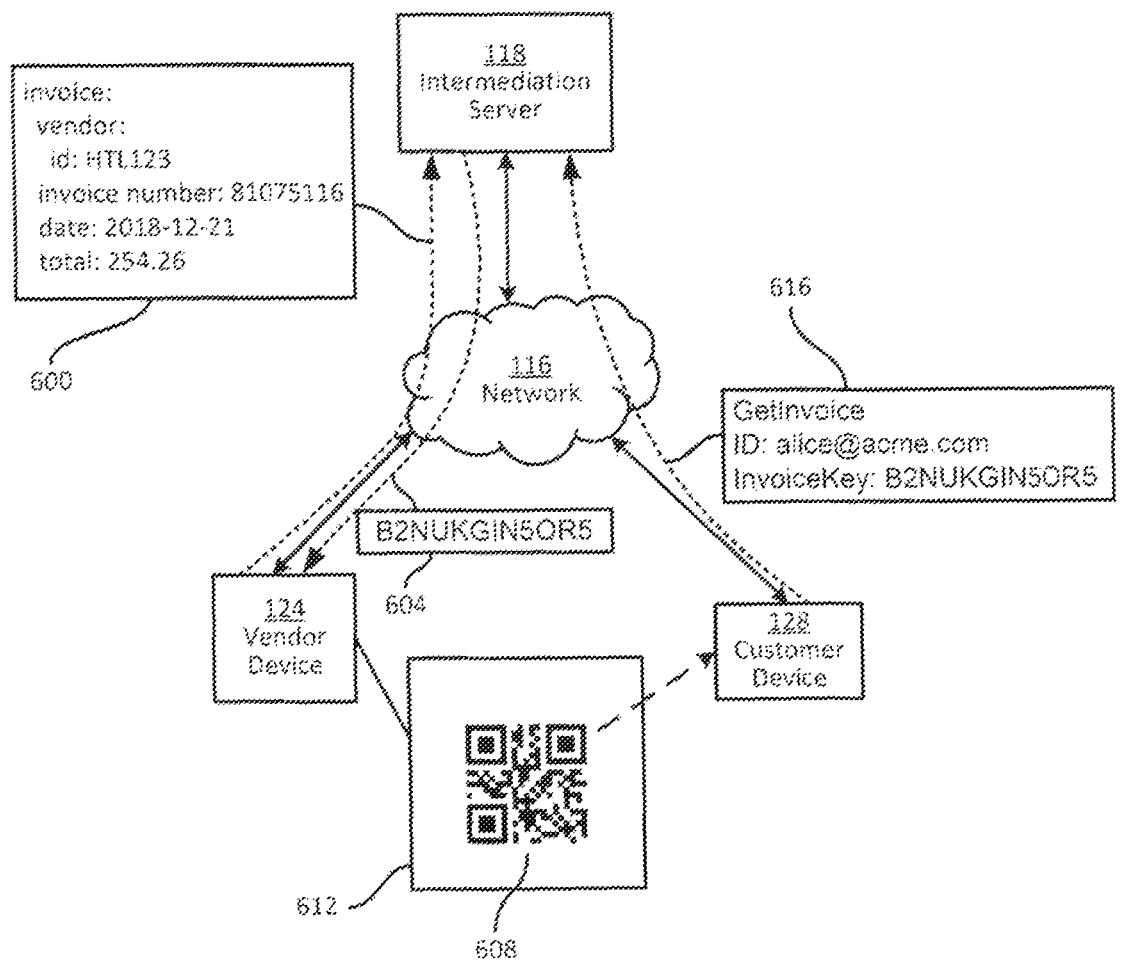
FIG. 6 depicts a portion of the system 100 during the performance of the method of FIG. 5.

At block 530, the server 118 is configured to receive the association request containing the invoice identifier and the customer identifier. At block 535, the server 118 is configured to store the customer identifier in the repository 120 in connection with the invoice data. FIG. 6 illustrates the above-mentioned process. In particular, FIG. 6 illustrates the transmission of structured invoice data 600 from the vendor device 124 to the intermediation server 118 (i.e. at block 305). As illustrated in FIG. 6, the invoice data 600 does not include any information identifying the customer 108 (in contrast to the invoice data 400 shown in FIG. 4A).

Following the receipt of the invoice data 600, the server 118 is configured to extract and store the vendor identifier "HTL123" at block 515. Further, in response to a negative determination at block 520, at block 525 the server 118 is configured to generate and transmit a unique invoice identifier 604 to the vendor device 124. In the present example, the identifier is the string "B2NUKGIN5OR5", although a wide variety of other identifier formats may also be employed.

Upon receipt of the invoice identifier 604, the vendor device 124 is configured to present the invoice identifier 604 for capture by the customer device 128. The mechanism of presentation, in the example shown in FIG. 6, is to render the string as a machine-readable indicium such as a QR code 608 on a display 612 of the vendor device 124. Other presentation mechanisms may also be employed, however, including transmitting the identifier 604 via short-range communication protocol (e.g. near-field communication, NFC). The customer device 128 is configured to capture the identifier 604, for example by capturing an image of the QR code 608 and decoding the identifier 604 therefrom. Following capture of the identifier 604, the customer device 128 is configured to transmit an association request 616 containing a customer identifier (e.g. "alice@acme.com") and the identifier 604. The request 616 may, for example, employ a "getinvoice" service implemented by the above-mentioned APIs exposed by the server 118. The server 118, responsive to receiving the request 116 (at block 530), stores the customer identifier in association with the invoice data. In other words, the process illustrated in FIGS. 5 and 6 enables the customer device 128 to "claim" invoice data provided to the server 118 without any customer identifier.

At block 535, the server 118 can also be configured to generate one or more notifications for transmission to one or more of the customer device 128, the vendor device 124, and the payer device 132. For example, when the invoice data is received from the vendor device 124 at block 305 and identifies the customer 108, such that there is no need for the invoice claiming process shown in FIG. 6, the server 118 can be configured to transmit a notification to the customer device 128 via execution of the notification application 216 containing at least a portion of the invoice data, indicating that the invoice data has been submitted by the vendor 104 and is undergoing processing. In further examples, when the invoice data is received from the customer device 128 at block 305, the server 118 can be configured to generate a notification for transmission to the vendor device 124 containing at least a portion of the invoice data, indicating that the invoice data has been submitted by the customer 108 and is undergoing processing.

Thus, returning to FIG. 3, following the performance of block 310, the repository 120 contains the invoice data received at block 305, as well as a structured version of the invoice data when the original invoice data was unstructured, and identifiers corresponding to each of the vendor 104 and the customer 108.

At block 315, the server 118 is configured to retrieve a payer identifier (i.e. corresponding to the payer 112 and therefore the payer device 132). For example, the payer ID may be retrieved from the profile repository 122 based on the customer identifier determined at block 310. More specifically, the repository 122 defines logical links between payer identifiers and customer identifiers, for example to indicate which customers 108 are associated with which payers 112 (e.g. by employment). Therefore, at block 315 the server 118 can be configured to query the repository 122 for a payer identifier that is logically linked to the customer identifier from block 310.

In other examples, the retrieval of the payer identifier at block 315 may be performed simultaneously with the performance of block 310. For example, the invoice data itself (as received at block 305) may contain the payer identifier. This may be the case when, for example, the products represented by the invoice data are travel-related services previously reserved by the payer 112 on behalf of the customer 108, and therefore previously associated with the payer 112. In such instances, the separate performance of block 315 is unnecessary and may be omitted. Following retrieval of the payer identifier at block 315, the server 118 can also be configured to transmit a notification to the payer device 132, for example containing at least a portion of the invoice data and at least one of the customer identifier and the vendor identifier.

Having retrieved the payer identifier at block 315, the server 118 is configured to proceed to block 320. At block 320, the server 118 is configured to retrieve a transaction policy for application to the primary transaction defined by the invoice data, based at least on the payer identifier from block 315. The profile repository 122, as noted earlier, contains rules and other settings for allocating portions of the price defined for a transaction between the payer 112 and the customer 108. The contents of the profile repository 122 also defines criteria for selecting methods of payment and information employed to effect payments from the payer 112 to the vendor 104. The above-mentioned information is collectively referred to as a transaction policy. The repository 122 contains a transaction policy for each payer 112 for which the system 100 has been deployed. At block 320 the server 118 is therefore configured to retrieve the transaction policy corresponding to the payer identifier (i.e. to the payer 112, in the present example).

In general, the transaction policy defines criteria for allocating expenses between the payer 112 and the customer 108. In other words, the transaction policy defines criteria permitting the server 118 to determine whether the product (s) indicated in the invoice data are eligible for payment by the payer 112, ineligible for payment by the payer 112 (and therefore require payment by the customer 108), or eligible only in part. The policy can define any of a wide variety of criteria for making the above allocation, a number of examples of which will occur to those skilled in the art.

An example of criteria defined in the transaction policy include criteria based on product types. For example, the policy can define eligible product types, such as hotel rooms, that are eligible for payment by the payer 112, and ineligible product types, such as minibar charges associated with hotel rooms, that are not eligible for payment by the payer 112. As will now be apparent, the invoice data received at block 305 typically itemizes individual products, and each product can therefore be assessed independently. Product type-based criteria can also specify that certain product types are partially eligible, e.g. that a specified percentage of the price of a product is eligible, or that the product is eligible up to a threshold price (and therefore that any portion of the product's price beyond the threshold is ineligible).

Further examples of criteria defined in the transaction policy include geographic criteria, defining whether expenses are eligible for payment by the payer 112 based on the geographic location of one or both of the vendor 104 and the customer 108. Still further examples of criteria defined in the transaction policy include validation criteria applied to certain product types. For example, the transaction policy can contain a criterion requiring the comparison of a vendor location to travel itinerary data corresponding to the customer 108, and specifying that the expense is eligible only if the vendor location aligns with the itinerary data. The itinerary data can be stored at the payer device 132, or at a distinct subsystem connected to the network 116.

At block 325, having retrieved the relevant transaction policy from the repository 122, the server 118 is configured to apply the policy to the invoice data. Application of the transaction policy to the invoice data serves to allocate an eligible portion of the price defined in the invoice data for payment by the payer 112. Any remaining portion of the price defined in the invoice data is ineligible for payment by the payer 112, and must instead be paid by the customer 108. The remaining, ineligible, portion of the price is therefore allocated for payment by the customer 108. The application of the policy at block 325 is performed by comparing the invoice data to the criteria defined by the policy, to determine which portion of the price defined by the invoice data is eligible. For example, a geographic criterion may be assessed by comparing a location of the vendor 104 (retrieved according to the vendor identifier obtained at block 310) to a location or region defined by the criterion.

The output of the application of the transaction policy is an allocation of the entirety of the total price defined in the invoice data (e.g. $254.26 in the invoice data shown in FIGS. 4A and 4B) between the payer 112 and the customer 108. The eligible portion, allocated to the payer 112, may be between zero and the entirety of the price. Any portion of the price that is not eligible is allocated to the customer 108, such that the sum of the eligible and ineligible portions is equal to the total price. The server 118 can be configured to transmit notifications to one or more of the payer device 132, the vendor device 124 and the customer device 128 indicating the allocations.

At block 330, the server 118 is configured to generate and transmit one or more of payment data and notification(s). In particular, when the eligible portion is non-zero, the server 118 is configured to generate payment data for transmission to one or more elements of the system 100 to initiate a payment of the eligible portion from the payer 112 to the vendor 104. When the eligible portion is zero, the generation of payment data is typically omitted, and the server 118 may generate notifications only at block 330.

Figure 7:
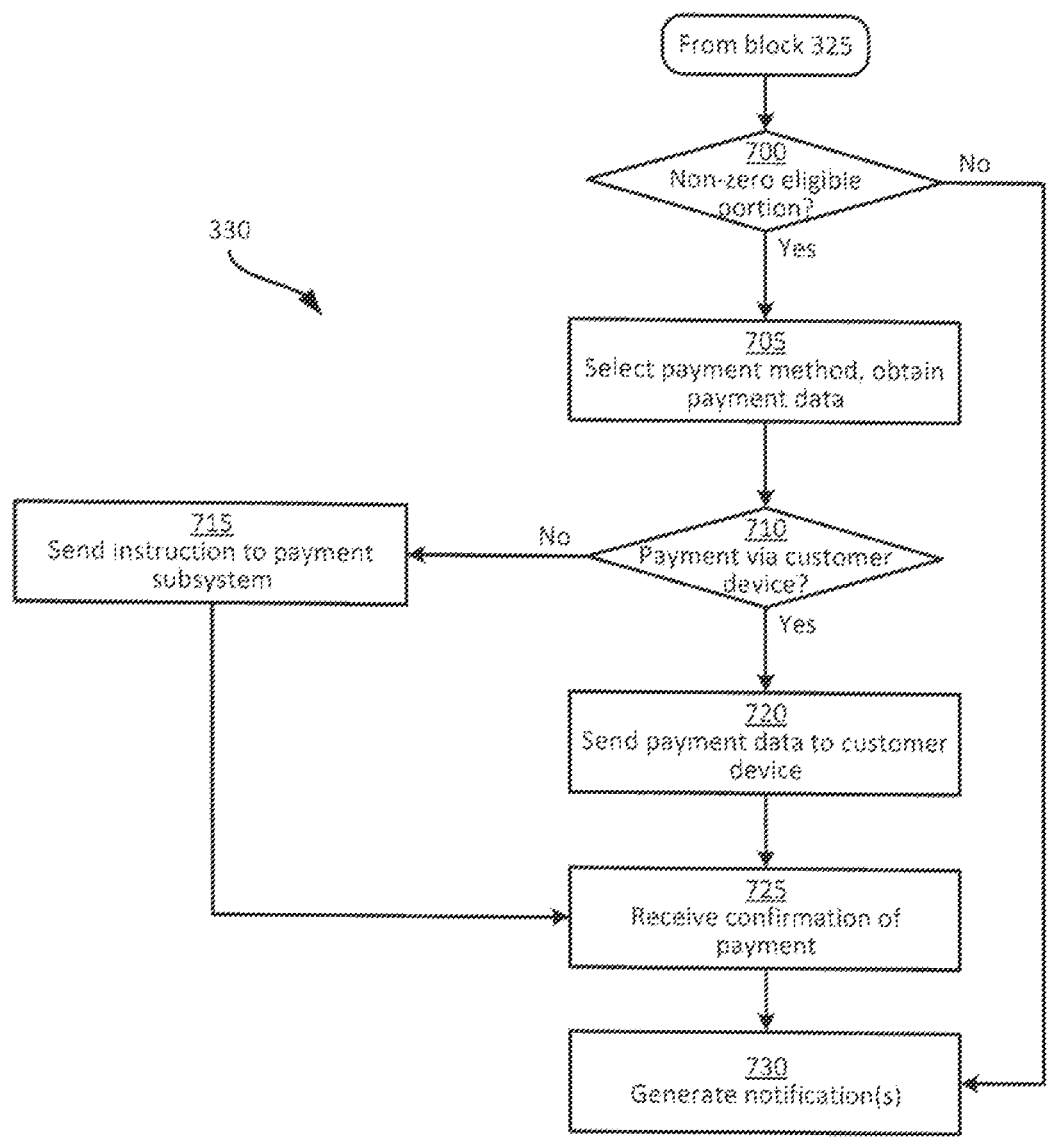
FIG. 7 depicts a method of performing block 330 of the method of FIG. 3.

Turning to FIG. 7, an example method of performing block 330 at the server 118 is illustrated. At block 700, the server 118 is configured to determine whether the eligible portion of the total price defined by the invoice data as determined at block 320 is non-zero. When the eligible portion is zero, indicating that the entire price defined by the invoice data is allocated to the customer 108 rather than the payer 112, the performance of block 330 passes directly to block 730 (to be discussed below), without generating payment data.

When the determination at block 700 is affirmative, the server 118 selects a payment method and obtains payment data at block 705. The selection of a payment method can be based on the transaction policy retrieved at block 320. For example, the transaction policy can define, in addition to the above-mentioned allocation criteria, payment method selection criteria. The payment method selection criteria define one or more payment methods and corresponding conditions under which each payment method may be selected. For example, certain payment methods may correspond to specific geographic areas, specific vendors, specific customers, or the like.

A variety of payment methods are contemplated, including payment methods initiated directly by the server 118 (e.g. wire transfers), and payment methods initiated by the customer device 128 using data received from the server 118. For example, the selected payment method may be a virtual credit card (VCC, also referred to as a virtual card number, VCN), in which the server 118 obtains and provides a VCN to the customer device 128, for subsequent presentation to the vendor device 124 to effect the payment.

The mechanism employed by the server 118 to obtain the payment data therefore varies with the selected payment mechanism. For example, in the case of a virtual credit card, the server 118 is configured, at block 705, to send a request to the payment subsystem 136 for a VCN associated with a predetermined account corresponding to the payer 112. For other payment methods, the payment data may be generated locally at the server 118, e.g. in the form of wire transfer instructions.

At block 710, the server 118 is configured to determine whether the payment method selected at block 705 requires payment to be effected via the customer device 128 (as noted above in connection with the VCN payment method). When the determination is negative, the server 118 proceeds to block 715, and transmits a payment instruction including the payment data to the payment subsystem 136. For example, the server 118 can transmit a wire transfer instruction to a financial institution for transferring the eligible portion allocated at block 325 from an account (e.g. defined in the repository 122) associated with the payer 112 to an account associated with the vendor 104.

Figure 8:
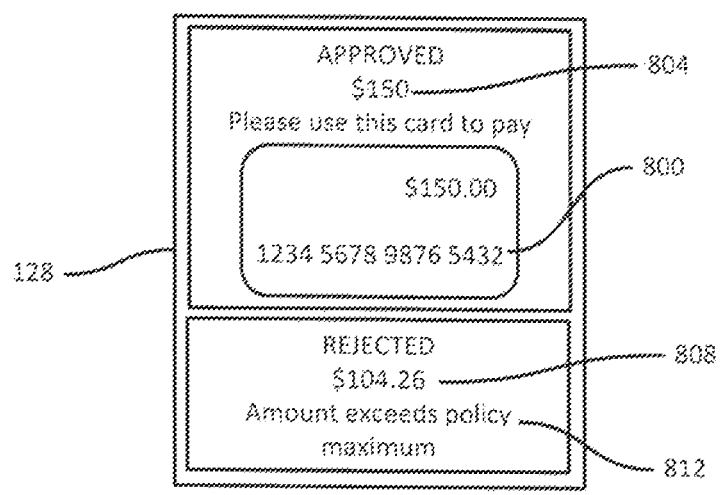
FIG. 8 depicts example payment and notification data received at the customer device of the system of FIG. 1 from the intermediation server.

When the determination at block 710 is affirmative, the server 118 instead transmits the payment data to the customer device 128 at block 720. For example, the server 118 can transmit the above-mentioned VCN to the customer device 128, for presentation to the vendor device 124 or an associated device (e.g. a point-of-sale terminal). The vendor device 124, in turn, transmits the VCN to the payment subsystem 136 to effect the payment, as will be apparent to those skilled in the art. The transmission of payment data to the customer device 128 at block 720 can be accompanied by a notification of any ineligible portion of the payment as allocated at block 325. For example, referring to FIG. 8, an example interface presented by the customer device 128 is illustrated, including payment data 800 received from the server 118 in the form of a virtual credit card, and an indication 804 of the eligible portion of the total invoice price. Also shown in FIG. 8 is a notification 808 (e.g. received along with the payment data) indicating that a portion of the invoice's price is ineligible for payment by the payer 112, and must be paid by the customer 108. The notification 808 can also include, in some examples, an indication 812 of the reason(s) for ineligibility (i.e. indications of which criteria in the transaction policy resulted in allocation of the ineligible portion to the customer 108).

Following the performance of either of blocks 715 and 720, at block 725 the server 118 awaits confirmation that the payment has been completed. Confirmation may be received at block 725 from the payment subsystem 136, for example in the form of an Instant Payment Notification (IPN) message generated by the payment subsystem 136.

Following receipt of payment confirmation at block 725, the server 118 is configured to generate at least one notification at block 730. In particular, the server 118 can notify any one or more of the payer device 132, the vendor device 124 and the customer device 128 that the payment has been completed.

Variations to the above systems and methods are contemplated. For example, in some embodiments the server 118 can be configured to generate and transmit payment data to the customer device (e.g. a VCN, as discussed above), without receiving invoice data defining a specific primary transaction. For example, the payment data may define a per-diem amount usable by the customer 108 for payment of any invoices (i.e. to any vendor 104). The performance of blocks 305-315, in other words, may be omitted and the payment data may be generated according to the transaction policy for a predetermined amount (or an amount requested by the customer device 128).

In further embodiments, certain blocks of the method 300 can be performed by the server 118 only in response to explicit requests, e.g. from the customer device 128. For example, the performance of block 320 may be initiated only in response to an approval request submitted by the customer device 128 (once the customer device 128 has received the processed invoice data obtained via blocks 305-315).

In further embodiments, transaction policies may be maintained at the payer device 132 rather than in the repository 122 at the intermediation server 118. In such embodiments, rather than retrieving a transaction policy at block 320 and applying the policy to allocate portions of the payment to the payer 112 and/or the customer 108, the server 118 is configured to transmit a request for a policy decision to the payer device 132. The request may include, for example, the invoice data as well as the identifiers determined at blocks 310 and 315. Responsive to the request, the server 118 receives a policy decision from the payer device 132, specifying the allocation of eligible and ineligible portions of the price defined by the invoice data.

Those skilled in the art will appreciate that in some embodiments, the functionality of the applications 212, 216 and 220 may be implemented using pre-programmed hardware or firmware elements (e.g., application specific integrated circuits (ASICs), electrically erasable programmable read-only memories (EEPROMs), etc.), or other related components.

The invention claimed is:

1. A method of real-time three-party transaction processing, comprising, at an intermediation server:
receiving, via a network, invoice data from a vendor computing device associated with a vendor, the invoice data defining a price payable to the vendor for supplying a product to a customer associated with a customer computing device;
generating a unique invoice identifier corresponding to the invoice data;
prior to initiation of a payment to the vendor for supplying the product:
extracting, from the invoice data, a vendor identifier corresponding to the vendor;
in response to determining that the invoice data does not contain a customer identifier corresponding to the customer computing device, (i)transmitting the unique invoice identifier to the vendor computing device for presentation of the unique identifier at the vendor computing device and capture of the unique identifier from the vendor computing device by the customer computing device, and (ii) receiving, from the customer computing device, an association request generated at the customer computing device responsive to capturing the unique identifier, and (iii) associate the customer identifier with the invoice data based on the association request, the association request containing the customer identifier and the unique invoice identifier;
retrieving a payer identifier corresponding to a payer associated with the customer identifier;
retrieving, based on at least the payer identifier, a transaction policy; according to the retrieved transaction policy, allocating an eligible portion of the price to the payer identifier, and allocating a remaining portion of the price to the customer identifier; and request a virtual card number (VCN) from a payment subsystem generating and transmitting payment data the VCN, via the network, for receipt at the customer computing device and presentation to the vendor computing device to initiate initiating a payment of the eligible portion from the payer to the vendor.

2. The method of claim 1, wherein extracting the vendor identifier comprises performing optical character recognition on the invoice data.

3. The method of claim 1, further comprising: when the remaining portion is non-zero, transmitting a notification to the customer computing device, the notification containing an indication of the remaining portion.

4. An intermediation server comprising:
a communications interface; and
a processor interconnected with the communications interface, the processor configured to:
receive, via the communications interface, invoice data from a vendor computing device associated with a vendor, the invoice data defining a price payable to the vendor for supplying a product to a customer associated with a customer computing device;
generate a unique invoice identifier corresponding to the invoice data;
prior to initiation of a payment to the vendor for supplying the product:
extract, from the invoice data, a vendor identifier corresponding to the vendor;
in response to determining that the invoice data does not contain a customer identifier corresponding to the customer computing device, (i) transmit the unique invoice identifier to the vendor computing device for presentation of the unique identifier at the vendor computing device and capture of the unique identifier from the vendor computing device by the customer computing device, (ii) receive, from the customer computing device, an association request generated at the customer computing device responsive to capturing the unique identifier, and (iii) associate the customer identifier with the invoice data based on the association request, the association request containing the customer identifier and the unique invoice identifier;
retrieve a payer identifier corresponding to a payer associated with the customer identifier;
retrieve, based on at least the payer identifier, a transaction policy;
according to the retrieved transaction policy, allocate an eligible portion of the price to the payer identifier, and allocate a remaining portion of the price to the customer identifier; and
request a virtual card number (VCN) from a payment subsystem generate and transmit the VCN, via the communications interface, for receipt at the customer computing device and presentation to the vendor computing device to initiate payment data for initiating a payment of the eligible portion from the payer to the vendor.

5. A system for real-time three-party transaction processing, comprising:

(i) a vendor computing device associated with a vendor, and configured to generate and transmit invoice data defining a price payable to the vendor for supplying a product to a customer associated with a customer computing device;
(ii) an intermediation server configured to:
receive the invoice data via a network from the vendor computing device;
generate a unique invoice identifier corresponding to the invoice data;
extract, from the invoice data, a vendor identifier corresponding to the vendor;
in response to determining that the invoice data does not contain a customer identifier corresponding to the customer computing device, (i) transmit the unique invoice identifier to the vendor computing device for presentation at the vendor computing device and capture by the customer computing device, and (ii) receive, from the customer computing device, an association request to associate the customer identifier with the invoice data, the association request containing the customer identifier and the unique invoice identifier;
retrieve a payer identifier corresponding to a payer associated with the customer identifier;
retrieve, based on at least the payer identifier, a transaction policy;
according to the retrieved transaction policy, allocate an eligible portion of the price to the payer identifier, and allocate a remaining portion of the price to the customer identifier;
request a virtual card number (VCN) from a payment subsystem generate and transmit payment data the VCN, via the network, for receipt at the customer computing device and presentation to the vendor computing device to initiating initiate a payment of the eligible portion from the payer to the vendor; and
(iii) the customer computing device associated with the customer, the customer computing device configured to:
capture the unique invoice identifier and transmit the association request containing the customer identifier and the unique invoice identifier to the intermediation server via the network;
receive the payment data VCN from the intermediation server via the network; and present the payment data VCN for receipt by the vendor computing device to execute the payment of the eligible portion.

6. The system of claim 5, wherein the vendor computing device is configured to execute the payment of the eligible portion by transmitting the VCN to the payment subsystem.

7. The intermediation server of claim 4, wherein the processor is configured to extract the vendor identifier by performing optical character recognition on the invoice data.

8. The intermediation server of claim 4, the processor is further configured to:
when the remaining portion is non-zero, transmit a notification to the customer computing device, the notification containing an indication of the remaining portion.

* * * * *